United States Patent [19]

Stones

[11] Patent Number: 5,724,737
[45] Date of Patent: Mar. 10, 1998

[54] SWITCH MECHANISM

[75] Inventor: Kevin Stones, Bishop Auckland, United Kingdom

[73] Assignee: Black & Decker Inc., Newark, Del.

[21] Appl. No.: 551,390

[22] Filed: Nov. 1, 1995

Related U.S. Application Data

[63] Continuation of Ser. No. 155,729, Nov. 22, 1993, abandoned.

[30] Foreign Application Priority Data

Nov. 25, 1992 [GB] United Kingdom ............. 9224660

[51] Int. Cl.$^6$ .............. A01G 3/053; F16P 3/18; B26B 19/02
[52] U.S. Cl. .............. 30/228; 30/216; 30/381; 192/131 R; 200/43.17; 200/321
[58] Field of Search ............. 30/208, 216, 228, 30/381, 382; 191/131 R, 129 R; 200/43.16, 43.17, 318, 321, 322

[56] References Cited

U.S. PATENT DOCUMENTS

| | | | |
|---|---|---|---|
| 2,182,018 | 12/1939 | Eickman | 192/131 R |
| 4,207,675 | 6/1980 | Causey et al. | 30/381 X |
| 4,381,037 | 4/1983 | Cuneo | 200/321 X |
| 4,569,431 | 2/1986 | Roeker | 192/131 R |
| 4,900,881 | 2/1990 | Fischer | 200/321 X |
| 5,076,411 | 12/1991 | Kramer et al. | 30/381 X |
| 5,145,044 | 9/1992 | Kramer et al. | 192/131 R |
| 5,150,523 | 9/1992 | McCurry | 30/382 X |
| 5,369,236 | 11/1994 | Nickels, Jr. | 200/331 X |

FOREIGN PATENT DOCUMENTS

| | | | |
|---|---|---|---|
| 2558567 | 7/1985 | France | 30/216 |
| 2613270 | 10/1988 | France . | |
| 3006405 | 8/1981 | Germany | 192/131 R |
| 3023033 | 1/1982 | Germany . | |
| 1057790 | 2/1967 | United Kingdom . | |
| 2139329 | 11/1984 | United Kingdom | 192/131 R |

Primary Examiner—Eugenia Jones
Attorney, Agent, or Firm—Charles E. Yocum; Kerry H. Owens

[57] ABSTRACT

A manual tool is driven by an electric motor, and has a primary handle and a secondary handle arranged at a distance from each other. A switch is situated in the manual tool and can only be switched on by the simultaneous actuation of two contact mechanisms, one arranged in each handle, the motor being switched off when grip on either handle is released. The tool further comprises an initiating device in the form of a safety interlock mechanism which is adapted to prevent actuation of the switch, unless the safety interlock mechanism is actuated prior to actuation of the contact mechanism arranged in the primary handle. The switching mechanism is particularly suitable for a hedge clipper or chainsaw, especially a cordless tool.

12 Claims, 3 Drawing Sheets

SWITCH MECHANISM

This application is a continuation of application Ser. No. 08/155,729, filed Nov. 22, 1993, now abandoned.

BACKGROUND OF THE INVENTION

The present invention relates to a manual tool driven by an electric motor, in particular a hedge clipper or chain-saw, for two handed operation.

German Patent No. 30,23,033 describes and claims a manual tool driven by an electric motor, in particular hedge shears or chain saw having two handles arranged at a distance from each other, and having a switch which is situated in the manual tool and can be actuated via at least one contact mechanism the motor being cut off from the mains when grip on the other handle is released and being braked by a braking device, characterised in that the switch can only be switched on by the simultaneous actuation of two contact mechanisms of which in each case one is arranged in each handle and in that, furthermore, there is pole reversal of the field winding of the motor relative to the armature winding to brake the motor and the motor is short-circuited.

A braking system such as that described in German Patent No. 30 23 033, in which there is pole reversal of the field winding of the motor relative to the armature winding to brake the motor, and the motor is short circuited is known as a regenerative braking system.

Such a tool has the disadvantage that if it is picked up by the two handles, for example for carrying from one location to another, it is possible for both contact mechanisms to be actuated and the motor switched on. This is a particular disadvantage if the system described in DE 3,023.033 is used in a manual tool of the cordless type, wherein the energy is supplied to the motor by means of a, usually rechargeable, battery. While with a mains operated tool, there is the added safety measure that it is necessary for the tool to be connected to the mains supply, and the supply to be switched on, before the motor operates; such a safety measure does not apply to a cordless tool.

In order to overcome this safety risk with a cordless tool, it has been proposed to provide two separate switches in the housing, one associated with the primary handle and the other associated with the secondary handle, and to provide one of these, usually the one associated with the primary handle, with some form of safety device, such as a lock-on or lock-off button.

However, safety regulations are increasingly requiring that manual tools are provided with a braking system in order to reduce the time for which the tool continues to operate after it has been switched off. The provision of a regenerative braking system increases, both the physical size and complexity, and hence the cost, of switches, so that it is a disadvantage to have to provide two switches in a unit.

BRIEF SUMMARY OF THE INVENTION

It is an object of the present invention to provide a manual tool driven by an electric motor, in particular a hedge clipper or chain saw, in which the above disadvantages are reduced or substantially obviated.

The present invention provides a manual tool driven by an electric motor, having a primary handle and a secondary handle arranged at a distance from each other, and having a switch which is situated in the manual tool and can only be switched on by the simultaneous actuation of two contact mechanisms, one arranged in each handle, the motor being switched off when grip on either handle is released, characterised in that the tool further comprises an initiating device in the form of a safety interlock mechanism, and the contact mechanism arranged in the primary handle can only be actuated when the initiating device is engaged.

DETAILED DESCRIPTION

Figure 1:
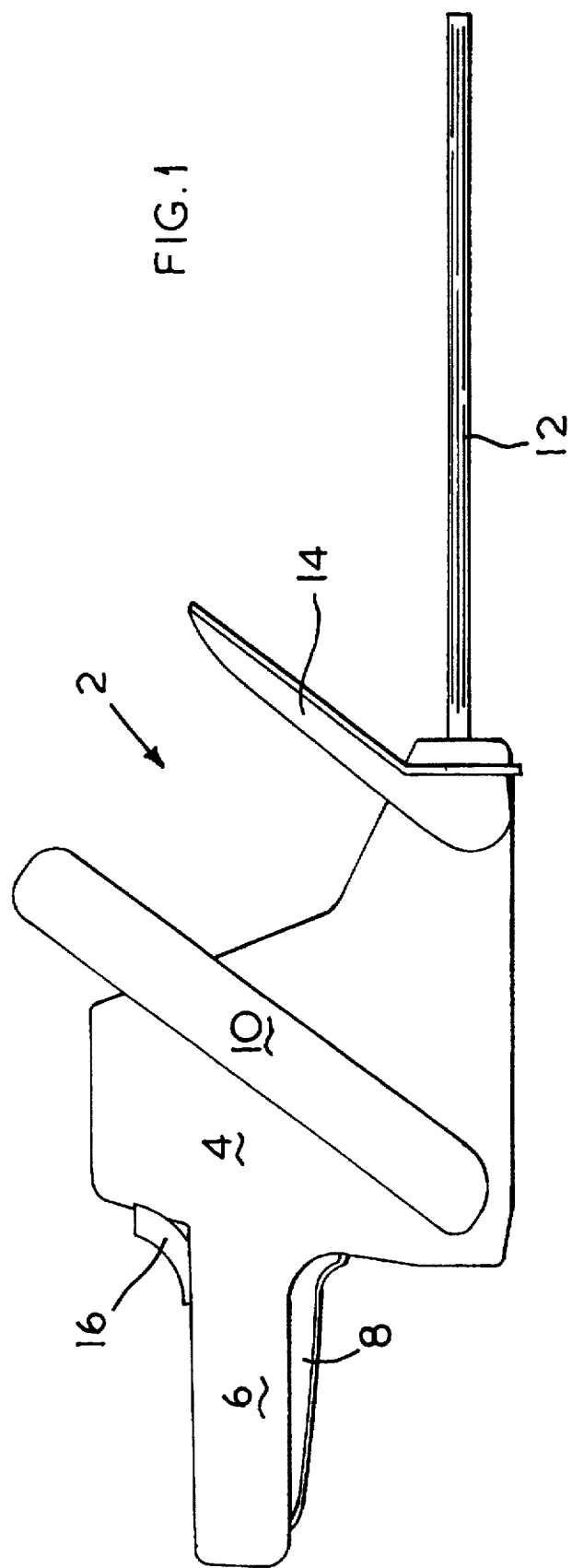
FIG. 1 is a view of an embodiment of a hedge clipper.

As can be seen from FIG. 1, a hedge clipper shown generally at (2) comprises a housing (4) within which is located the motor 100. A primary handle (6) is provided with a trigger switch actuator (8). A secondary, bail handle (10) is provided with an actuating mechanism (not shown). The blades (12) are mounted in known manner in the housing (4) for driving by the motor. A guard (14) is mounted on the housing (4), also in known manner, to protect the operator.

A safety interlock button (16) is located in the upper portion of the housing (4) and projects from the upper surface of the housing. The operation of the button (16) will be described in more detail below.

Figure 2:
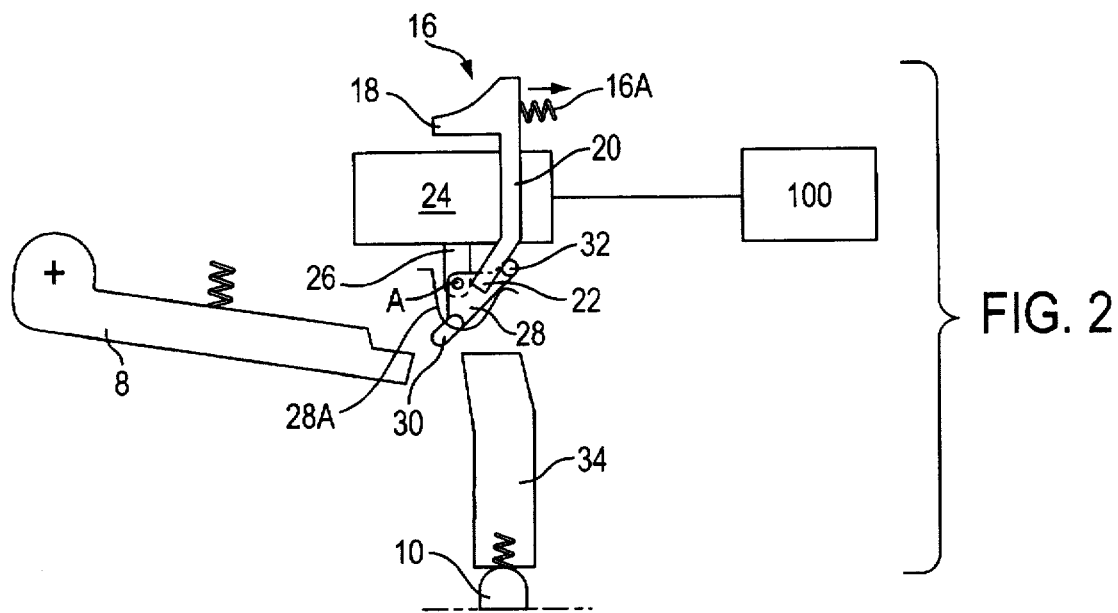
FIGS. 2 to 5 are schematic diagrams of the switching mechanism at different stages of the operating of the unit.

As can be seen from FIG. 2, the safety interlock button (16) is generally L-shaped, and is slideably mounted in the housing (4) so that the short portion (18) of the "L" projects. The button (16) is free to slide in a substantially horizontal plane, towards the right (with reference to FIG. 2), and is biased by a spring (16A) towards the left, (with reference to FIG. 2). The free end (20) of the safety interlock button (16), which extends into the housing (4), terminates in a cam section (22).

A switch (24) is mounted within the housing (4). A switch contact arm (26) extends from the switch in a downwards, substantially vertical (with reference to FIG. 2) direction. A rocker element (28) is pivotally mounted at the lower (free) end of the contact arm (26) for pivoting about the axis A and is spring loaded by a spring (28A) into the position shown in FIG. 2. Projections (30, 32) are formed in the side wall of the rocker element (28).

The bail handle (10) engages a switch actuating member (34).

The operation of the safety interlock mechanism will now be described with reference to FIGS. 2 to 5, which shown the mechanism in different stages of the operating cycle.

In FIG. 2, the safety interlock button (16) is in the non-engaged position, and the trigger actuator (8) and bail handle (10) are similarly in the non-engaged positions.

If pressure is applied to the trigger actuator (8) alone, with the safety interlock button in the non-engaged position, as shown in FIG. 2, the trigger actuator (8) travels past the rocker element (28) without engaging the projection (30). There is therefore no actuation of the switch (24).

Figure 3:
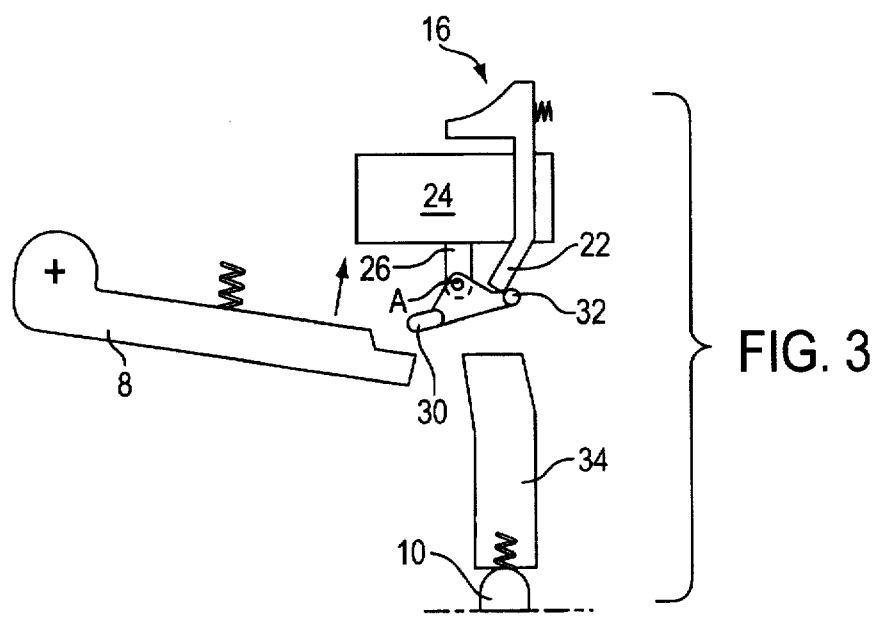

In FIG. 3, the mechanism is shown in the orientation in which the safety interlock button (16) has been pushed to the right (with reference to FIG. 3) against the action of the biasing spring. The cam section (22) of the safety interlock (16) engages the projection (32) on the rocker element (28), and causes the rocker element (28) to pivot about its axis A, against the tension of spring (28A), so that the projection (30) on the element is moved into the path of the trigger actuator (8).

Figure 4:
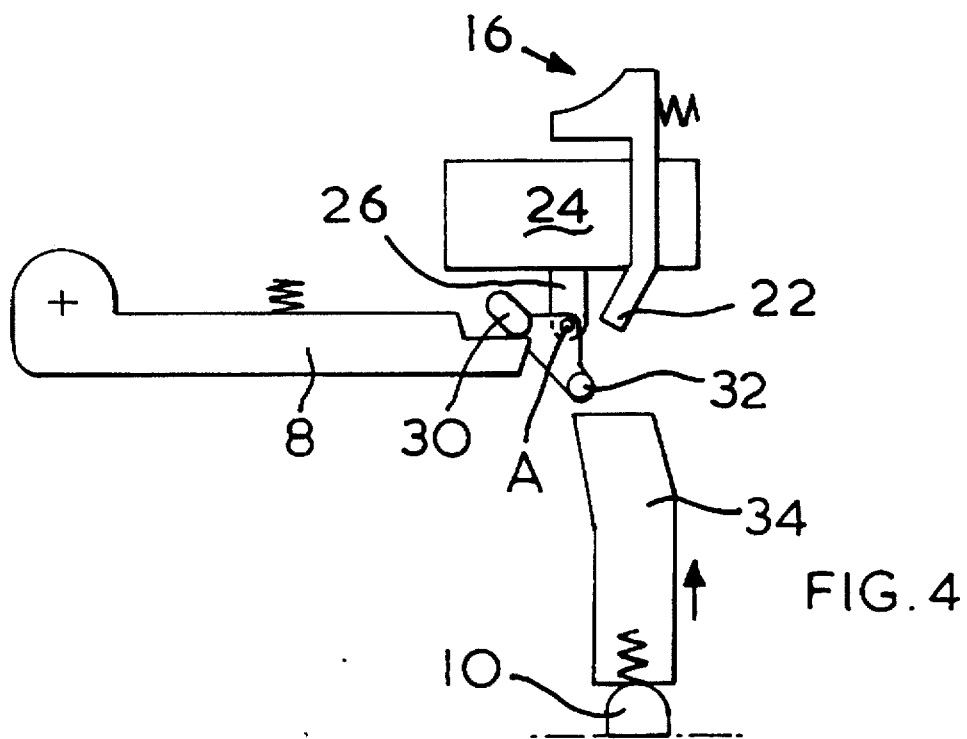
Figure 5:
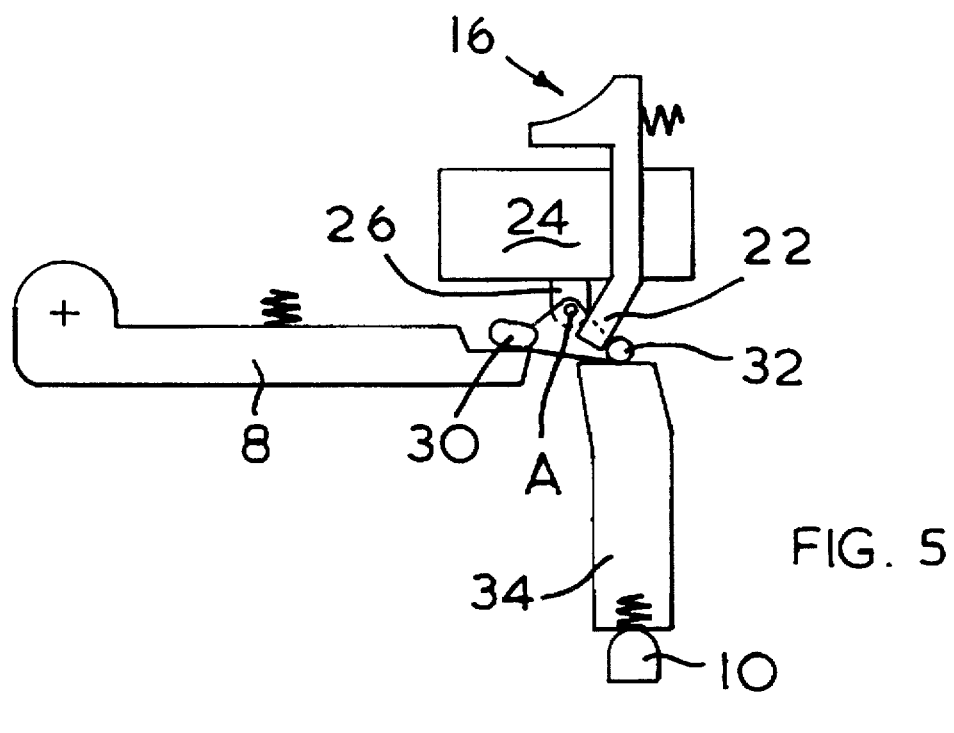

If pressure is applied to the trigger actuator (8), with the safety interlock (16) in the engaged position, the actuator (8)

engages the projection (30) of the rocker element (28), allowing it to be further pivoted about the axis A to the position shown in FIG. 4.

With the switch actuating member (34) of the bail handle (10) in the non-engaged position, as shown in FIG. 4, the engagement of the trigger actuator (8) with the projection (30) simply causes the rocker element (28) to pivot about the axis A, without actuating the switch contact arm (26).

However, if, with the safety interlock (16) in the engaged position as shown in FIG. 3, pressure is applied simultaneously to the trigger actuator (8) and switch actuating member (34), then the rocker element (28) is not free to pivot about its axis A, but is instead constrained to move in a substantially vertically upwards direction, with reference to FIGS. 2 to 5, hence actuating the switch contact arm (26) and operating the switch (24). The motor is thus switched on.

Once the trigger actuator (8) has engaged the projection (30), the operator is free to release the safety interlock (16). However, if the operator releases either the trigger actuator (8), or the switch actuating member (34) associated with the bail handle (10), the pressure on one or other end of the rocker element (28),and hence on the contact arm (26), is released, and the motor is switched off.

Similarly, it will be clear from the Figures that pressure on the switch actuating member (34) alone will simply position the free end of the switch actuating member (34) below the projection (32) on the rocker element (28) leaving the rocker element (28) in its rest position and therefore not actuating the switch contact arm (26).

I claim:

1. A tool comprising:
    an electric motor;
    a primary handle;
    a secondary handle separated by a distance from said primary handle;
    a primary contact mechanism connected to said primary handle;
    a secondary contact mechanism connected to said secondary handle;
    said primary and secondary contact mechanisms being movable by grip contact on said primary and secondary handles;
    a switch for actuating said electric motor;
    first and second projections associated with the switch;
    said switch being switched on to provide electric power to said motor when both said primary and secondary contact mechanisms contact, respectively, said first and second projections, such contact resulting from gripping of said primary handle and said secondary handle, and said switch being switched off by releasing the contact between at least one of the first and second projections and at least one of said primary and secondary contact mechanisms; and
    movable interlocking means for preventing actuation of said switch when said movable interlocking means is disposed in a first position, and for allowing actuation of the switch when said movable interlocking means is disposed in a second position.

2. The tool of claim 1, further comprising:
    a switch contact arm extending from said switch, said switch contact arm having a free end;
    a rocker element being pivotally mounted on said free end of said switch contact arm, said first and second projections being provided on said rocker element; and
    said rocker element being operatively engagable with said movable interlocking means to pivot said rocker element into a path of movement of said primary contact mechanism.

3. The tool of claim 2, wherein said movable interlocking means further comprises:
    a substantially "L" shaped button having a long end and a short end;
    said long end of said button operating as a cam; and
    a spring located opposite said button's short end and normally biasing said button in the first position.

4. The tool of claim 3, wherein contacting said button's short end overcomes said spring's biasing, thereby causing said cam to engage said rocker element and pivot said rocker element into the path of movement of said primary contact mechanism.

5. The tool of claim 2, wherein when disposed in the second position, said movable interlocking means enables both of said primary and secondary contact mechanisms to contact said rocker element and thereby actuate said switch.

6. The tool of claim 1, wherein actuation of said switch permits movement of said movable interlocking means to the first position without deactuation of said switch.

7. The tool of claim 1, wherein said movable interlocking means prevents actuation of said switch by preventing contact of said primary contact mechanism with said first projection.

8. A tool comprising:
    an electric motor;
    a primary handle and a secondary handle arranged at a distance from each other and being connected respectively to a primary contact mechanism and a secondary contact mechanism;
    a switch which is situated in said tool and switches the motor on when both said primary contact mechanism and said secondary contact mechanism are moved to actuate said switch, the movement of said primary and said secondary contact mechanisms with respect to the switch being effected by gripping said primary and secondary handles; said motor being switched off when gripping on at least one of said handles is released;
    an initiating device comprising an interlock mechanism operatively associated with said switch which, in a first position, prevents actuation of said switch, and in a second position allows actuation of the switch;
    a switch contact arm for actuating said switch, said switch contact arm extending from said switch and having a free end; and
    a rocker element pivotally mounted on the free end of the switch contact arm, wherein operation of said interlock mechanism adjusts said rocker element to enable said primary contact mechanism to contact said rocker element.

9. A tool comprising:
    an electric motor;
    a primary handle having a primary contact mechanism;
    a secondary handle arranged at a distance from the primary handle, said secondary handle having a secondary contact mechanism;
    primary and secondary projections, connectable, respectively, with said primary and secondary contact mechanisms;
    a switch associated with said primary and secondary projections, the switch being configured to activate the electric motor when both the primary contact mechanism and the secondary contact mechanism are moved to contact respectively, the primary and secondary projections upon actuation of both the primary handle and the secondary handle, and to deactivate the motor when at least one of the primary handle and the secondary handle is released to disconnect at least one of the primary and secondary contact mechanisms from at least one of the primary and secondary projections; and a safety interlock mechanism operatively associated with said switch movable between a first position in which the safety interlock mechanism prevents contact between the primary contact mechanism and the primary projection, and a second position in which the safety interlock mechanism allows contact between the primary contact mechanism and the primary projection.

10. A tool according to claim 9, wherein said safety interlock mechanism includes a cam which allows contact between the secondary projection and said secondary contact mechanism.

11. A tool according to claim 10, further comprising a switch contact arm having a free end, and a rocker element pivotally mounted on said free end of said switch contact arm, said primary and secondary projections being provided on said rocker element, such that when disposed in the second position, said safety interlock mechanism allows said primary contact mechanism to contact said primary projection on said rocker element.

12. A tool according to claim 11, wherein said tool comprises blades for hedge clipping.

* * * * *